United States Patent
Montero et al.

(10) Patent No.: US 10,853,179 B2
(45) Date of Patent: Dec. 1, 2020

(54) INFORMATION HANDLING SYSTEM AND METHOD FOR RESTORING FIRMWARE IN ONE OR MORE REGIONS OF A FLASH MEMORY DEVICE

(71) Applicant: DELL PRODUCTS L.P., Round Rock, TX (US)

(72) Inventors: Adolfo S. Montero, Pflugerville, TX (US); Benson Lai, Neihu District (TW)

(73) Assignee: Dell Products L.P., Round Rock, TX (US)

( * ) Notice: Subject to any disclaimer, the term of this patent is extended or adjusted under 35 U.S.C. 154(b) by 152 days.

(21) Appl. No.: 16/229,264

(22) Filed: Dec. 21, 2018

(65) Prior Publication Data

US 2020/0201714 A1 Jun. 25, 2020

(51) Int. Cl.
*G06F 11/14* (2006.01)
*G06F 13/42* (2006.01)
(Continued)

(52) U.S. Cl.
CPC ........ *G06F 11/1417* (2013.01); *G06F 9/4401* (2013.01); *G06F 11/1469* (2013.01);
(Continued)

(58) Field of Classification Search
CPC ............. G06F 11/1417; G06F 11/1446; G06F 11/1458; G06F 11/1469; G06F 11/1666; G06F 11/2017; G06F 11/2284; G06F 2201/2278; G06F 9/4401; G06F 9/4403; G06F 13/4282; G11C 29/70; G11C 29/74
See application file for complete search history.

(56) References Cited

U.S. PATENT DOCUMENTS 6,757,838 B1 6/2004 Chaiken et al.
7,069,431 B2 6/2006 Dayan et al.
(Continued)

OTHER PUBLICATIONS

"Securely Sharing A Memory Between an Embedded Controller (EC) and a Platform Controller Hub (PCH)", U.S. Appl. No. 15/922,694, filed Mar. 15, 2018, 17 pgs.
(Continued)

*Primary Examiner* — Gabriel Chu
(74) *Attorney, Agent, or Firm* — Egan Peterman Enders Huston

(57) ABSTRACT

An information handling system (IHS) may include a platform controller hub (PCH), an embedded controller (EC) configured to execute a boot block stored in ROM to initiate a boot process for the IHS, a Flash memory device configured to store EC application firmware, boot firmware and backup boot firmware, which is substantially identical to the boot firmware, and an SPI bus that directly connects the EC to the Flash memory device during a portion of the boot process when the PCH is in reset. The EC uses the SPI bus to access the Flash memory device, retrieve the EC application firmware stored therein, store a local copy of the EC application firmware in internal RAM and execute the local copy of the EC application firmware while the PCH is in reset. The EC application firmware stored in RAM includes boot recovery firmware, which may be executed by the EC to restore the boot firmware if the boot firmware is damaged or corrupt.

22 Claims, 4 Drawing Sheets

(51) Int. Cl.
*G06F 9/4401* (2018.01)
*G06F 11/22* (2006.01)
*G06F 21/57* (2013.01)

(52) U.S. Cl.
CPC ...... *G06F 11/2284* (2013.01); *G06F 13/4282* (2013.01); *G06F 21/575* (2013.01)

(56) References Cited

U.S. PATENT DOCUMENTS

| | | | |
|---|---|---|---|
| 9,417,967 | B2 | 8/2016 | Huang et al. |
| 9,846,616 | B2 | 12/2017 | Grobelny |
| 9,846,617 | B2 | 12/2017 | Rahardjo et al. |
| 2007/0288737 | A1* | 12/2007 | Boyle .................. G06F 8/65 713/1 |
| 2015/0149815 | A1* | 5/2015 | Maity ............... G06F 11/0706 714/5.11 |
| 2016/0019116 | A1 | 1/2016 | Gopal et al. |
| 2016/0055068 | A1* | 2/2016 | Jeansonne ............. G06F 3/0683 714/15 |
| 2016/0055069 | A1* | 2/2016 | Jeansonne ............. G06F 3/0683 714/15 |
| 2016/0055113 | A1* | 2/2016 | Hodge ................. G06F 21/575 710/308 |
| 2016/0085667 | A1 | 3/2016 | Huang |
| 2016/0306623 | A1* | 10/2016 | Su ....................... G06F 13/4022 |

OTHER PUBLICATIONS

Chaiken et al., "Systems and Methods for Detecting Errors and/or Restoring Non-Volatile Random Access Memory Using Error Correction Code", U.S. Appl. No. 15/962,665, filed Aug. 23, 2018, (DELLL:233); 32 pgs.

* cited by examiner

INFORMATION HANDLING SYSTEM AND METHOD FOR RESTORING FIRMWARE IN ONE OR MORE REGIONS OF A FLASH MEMORY DEVICE

FIELD

This invention relates generally to information handling systems (IHSs), and more particularly, to IHS software and hardware components and related methods for restoring firmware that is damaged or corrupted.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems (IHSs) typically include a boot system such as, for example, a Basic Input/Output System (BIOS) or Unified Extensible Firmware Interface (UEFI) that operates to initialize hardware components during the boot process and to provide runtime services for operating systems and programs. The boot system code is generally implemented as boot firmware, which is typically stored in non-volatile memory, such as read only memory (ROM) or a Flash memory device.

In some information handling systems, a small amount (e.g., up to about 1 MB) of boot code (e.g., a "boot block") may be stored in ROM, while the majority of the boot code (e.g., a "main BIOS image") is stored in a Flash memory device. Upon system start-up or reboot, a processing device (such as a central processing device, CPU, or an embedded controller, EC) may execute the boot block stored in ROM to initiate the boot process and retrieve the main BIOS image from the Flash memory device. The processing device may then execute boot code within the main BIOS image to test and initialize the IHS hardware components, load an operating system (OS) from a computer readable storage medium, and/or perform a variety of other actions known in the art.

If the boot system fails, the operating system does not load and the information handling system may be rendered unusable. A boot failure may occur when the main BIOS image stored in Flash memory is missing, misconfigured or corrupt. For example, the main BIOS image stored in Flash memory may be damaged or corrupt when updates or changes are made to the main BIOS image. If the main BIOS image is damaged or corrupt, the processing device may fail to boot the information handling system and the system may be left in a hung state.

Some information handling systems utilize a boot recovery system or method to replace a damaged boot block or main BIOS image with an undamaged boot block/main BIOS image. In some conventional boot recovery systems, a recovery BIOS image may be stored within an internal storage device (e.g., a hard disk drive, HDD, solid state drive, SDD, or controller) contained within the IHS, or within an external storage device (e.g., a USB storage device) removably coupled to the IHS. The recovery BIOS image may be substantially identical to the main BIOS image initially stored in Flash memory, and in some cases, may include the entire BIOS region. If the boot block is undamaged, the processing device may execute the boot block to replace a damaged main BIOS image with an undamaged recovery BIOS image obtained from an internal or external storage device, thereby restoring the main BIOS image in Flash memory. When the IHS is rebooted, the restored BIOS image may be executed by the processing device to successfully complete the boot process.

The conventional boot recovery system discussed above suffers from several disadvantages. For example, recovering the BIOS image from an external storage device (such as a USB storage device) is inconvenient, as it requires a user to copy the main BIOS image to the external storage device when the system is first configured, and then locate and manually insert the storage device to restore the system. On the other hand, recovering the BIOS image from an internal storage device (such as a HDD, SDD or controller) adds undesirable complexity in layers of protection to ensure that the boot recovery region remains intact. Finally, the aforementioned boot recovery system is not able to restore a damaged boot block. When the boot block is corrupt, the only recourse may be to send the information handling system back to the service center or factory for repair.

In other conventional boot recovery systems, a backup boot block may be stored in ROM, along with the primary boot block, to provide a means for restoring the boot system when the primary boot block is damaged. In such boot recovery systems, a user of the information handling system may use a Hot key or jumper to trigger a "top swap" action (e.g., by setting a top swap register in the chipset to 1) if the primary boot block is damaged. The top swap action redirects the processing device from the first boot entry pointer (i.e., memory location of the primary boot block, 0xFFFFFFF0) to the top swap address (i.e., memory location of the backup boot block, 4G). The processing device may then execute the backup boot block to recover the BIOS image from an external storage device (such as a USB storage device) or an internal storage device (such as a HDD, SDD or controller). As noted above, the recovery BIOS image stored in the internal/external storage device may be identical to the main BIOS image initially stored in Flash memory, and in some cases, may include entire BIOS region. After restoring the BIOS image in Flash memory, the top swap register may be set to 0, and the system may be rebooted using the restored BIOS image to successfully complete the boot process.

In the aforementioned boot recovery system, a top swap action is used to redirect the processing device to a backup boot block stored in ROM when the primary boot block is damaged or corrupt. While the top swap boot recovery method provide a means for restoring the boot system when the primary boot block is damaged, the method is chipset dependent (supported only by Intel) and is an optional feature that carries an additional licensing cost. To implement the Intel top swap boot recovery method, the primary boot block and the backup boot block are each limited to a maximum size of 1 MB. If the optional top swap feature is supported by the chipset, the boot system must re-layout the boot system map, which requires changes to be made to the BIOS code. Finally, the top swap boot recovery method still uses an internal or external storage device to recover the BIOS image, and thus, suffers from inconvenience or complexity, as discussed above.

SUMMARY OF THE INVENTION

The following description of various embodiments of information handling systems and related methods is not to be construed in any way as limiting the subject matter of the appended claims.

According to various embodiments of the present disclosure, information handling systems and methods are provided herein for restoring firmware contained within one or more regions of a Flash memory device of an information handling system. In one or more of the embodiments disclosed herein, a Flash memory device contained within an information handling system may be configured to store EC application firmware, boot firmware and backup boot firmware, which is substantially identical to the boot firmware. As used herein, the boot firmware and backup boot firmware stored in the Flash memory device may include system BIOS (or UEFI) firmware, and in some embodiments, may include other critical Flash firmware components (e.g., ME/ISH/etc.). As described in more detail below, hardware and software components are provided within the information handling system for restoring the boot firmware, if the boot firmware is determined to be damaged or corrupt. For example, an embedded controller (EC) of the information handling system may be configured to restore the boot firmware (if need be) by copying the backup boot firmware stored within the Flash memory device into the boot firmware region of the Flash memory device.

Unlike conventional boot recovery systems and methods, the systems and methods disclosed herein may be used to restore the entire boot firmware region within the Flash memory device without the need for user intervention (e.g., without requiring a user to press a Hot key, change a jumper or insert a USB key). In addition, the disclosed systems and methods are chipset independent, do not require any boot firmware changes or additional hardware, and do not store a backup copy of the boot firmware in an internal or external storage device (e.g., a HDD, SDD, controller, or USB storage device), which is separate and distinct from the Flash memory device. By moving the boot recovery process to an independent controller or processor (e.g., an EC), which is separate from the main processing unit (e.g., a host processor or CPU), the disclosed systems and methods enable the main processing unit to be recovered (in the event the CPU firmware is corrupt or compromised), and moves the security attack vector from the main processing unit to the independent controller/processor, which is better protected against attacks.

According to one embodiment, an information handling system (IHS) is provided herein comprising a platform controller hub (PCH), an embedded controller (EC), a Flash memory device, and a Serial Peripheral Interface (SPI) bus, which directly connects the EC to the Flash memory device during a portion of a boot process when the PCH is in reset. For the purposes of this disclosure, the SPI bus may "directly connect" the EC to the Flash memory device by providing a conduit through which the EC may access the Flash memory device without the assistance of, or permission from, the PCH to do so. As described in more detail below, the direct access afforded to the EC by the SPI bus enables the EC to restore the boot firmware (if need be) before the PCH comes out of reset.

In one or more embodiments described herein, the Flash memory device may be configured to store EC application firmware, boot firmware and backup boot firmware, which is substantially identical to the boot firmware. In some embodiments, the Flash memory device may be configured to store additional firmware in other regions of the Flash memory device. The EC may generally include read only memory (ROM), random access memory (RAM), and a processing device, which may be configured to execute a boot block stored in the EC ROM to initiate a boot process for the IHS.

Upon system start-up or reboot, the EC may be configured to bypass the PCH and directly access the Flash memory device via the SPI bus while the PCH is in reset to: retrieve EC application firmware from the Flash memory device, store a local copy of the EC application firmware in RAM and execute the local copy of the EC application firmware. The local copy of the EC application firmware stored in RAM may include boot recovery firmware, which may be executable by the processing device to restore the boot firmware contained within a boot firmware region of the Flash memory device, if the boot firmware is determined to be damaged or corrupt.

If the boot firmware is damaged or corrupt, the EC may access the Flash memory device via the SPI bus to restore the boot firmware by copying the backup boot firmware into the boot firmware region (i.e., the region of the Flash memory device comprising the boot firmware) of the Flash memory device. If boot recovery is needed, the EC may restore the boot firmware before the PCH comes out of reset and before a central processing unit (CPU) of the IHS begins executing the boot firmware stored within the boot firmware region of the Flash memory device. The SPI bus directly connecting the EC to the Flash memory device may also be closed or blocked before the CPU begins executing the boot firmware stored in the Flash memory device.

In some embodiments, the boot recovery firmware may be executable by the processing device to restore the boot firmware upon: receiving a command or a flag from another information handling system component, detecting a Hot key trigger, or detecting a timer expiration indicating that a problem has occurred with the boot process.

In some embodiments, the boot recovery firmware may be executable by the processing device to: perform an integrity check on the boot firmware stored in the Flash memory device to determine if the boot firmware is damaged or corrupt, and restore the boot firmware if the integrity check returns an error. In one example, the boot recovery firmware may be executable to perform the integrity check by applying a cryptographic hash function to a payload of the boot firmware. In some embodiments, the boot recovery firmware may be executable by the processing device to check the integrity of other firmware regions within the Flash memory device, and to restore one or more of the other firmware regions if they are damaged or corrupt.

According to another embodiment, a method is provided herein for restoring firmware contained within one or more regions of a Flash memory device contained an information handling system (IHS). The method steps disclosed herein may be performed by an embedded controller (EC) of an IHS during a boot process for the IHS. More specifically, a processing device of an embedded controller may execute program instructions stored within internal ROM and RAM to perform various method steps disclosed below.

In some embodiments, the EC may perform the disclosed method by accessing the Flash memory device via an SPI bus, which directly connects the EC to the Flash memory device, to fetch a copy of EC application firmware stored within an EC firmware region of the Flash memory device, storing the copy of the EC application firmware in random access memory (RAM), and executing the copy of the EC application firmware stored in RAM to restore firmware contained within one or more regions of the Flash memory device if the firmware contained therein is determined to be damaged or corrupt. If the firmware contained within one or more regions of the Flash memory device is damaged or corrupt, the EC may restore the firmware by copying a backup copy of the firmware, which is stored within another region of the Flash memory device, into the one or more regions of the Flash memory device. In some embodiments, the EC may perform said accessing, storing and executing steps before a platform controller hub (PCH) of the IHS comes out of reset and assumes control of the Flash memory device.

In some embodiments, the EC may perform an integrity check on the EC application firmware stored within the EC firmware region of the Flash memory device before fetching the copy of EC application firmware. If the integrity check determines that the EC application firmware is damaged or corrupt, the EC may access the Flash memory device, via SPI bus, to fetch a backup copy of the EC application firmware from the Flash memory device, store the backup copy of the EC application firmware in RAM, and execute the backup copy of the EC application firmware stored in RAM to restore firmware contained within one or more regions of the Flash memory device if the firmware contained therein is determined to be damaged or corrupt.

In some embodiments, the EC may perform said executing step upon: receiving a command or a flag from another information handling system component, detecting a Hot key trigger, or detecting a timer expiration indicating that a problem has occurred with the boot process.

In other embodiments, the EC may perform said executing step by performing an integrity check on the firmware contained within one or more regions of the Flash memory device to determine if the firmware contained therein is damaged or corrupt, and restoring the firmware if the integrity check returns an error. In some embodiments, the EC may perform an integrity check on the firmware by applying a cryptographic hash function to the firmware contained within one or more regions of the Flash memory device.

In some embodiments, the EC may perform said executing step to restore boot firmware, which is stored within a boot firmware region of the Flash memory device. If the boot firmware is determined to be damaged or corrupt, the EC may perform said executing step to restore the boot firmware before a central processing unit (CPU) of the IHS begins executing the boot firmware within the boot firmware region of the Flash memory device. The SPI bus directly connecting the EC to the Flash memory device may also be closed or blocked before the CPU executing the boot firmware within the boot firmware region of the Flash memory device.

BRIEF DESCRIPTION OF THE DRAWINGS

Other advantages of the present disclosure will become apparent upon reading the following detailed description and upon reference to the accompanying drawings in which.

Figure 1:
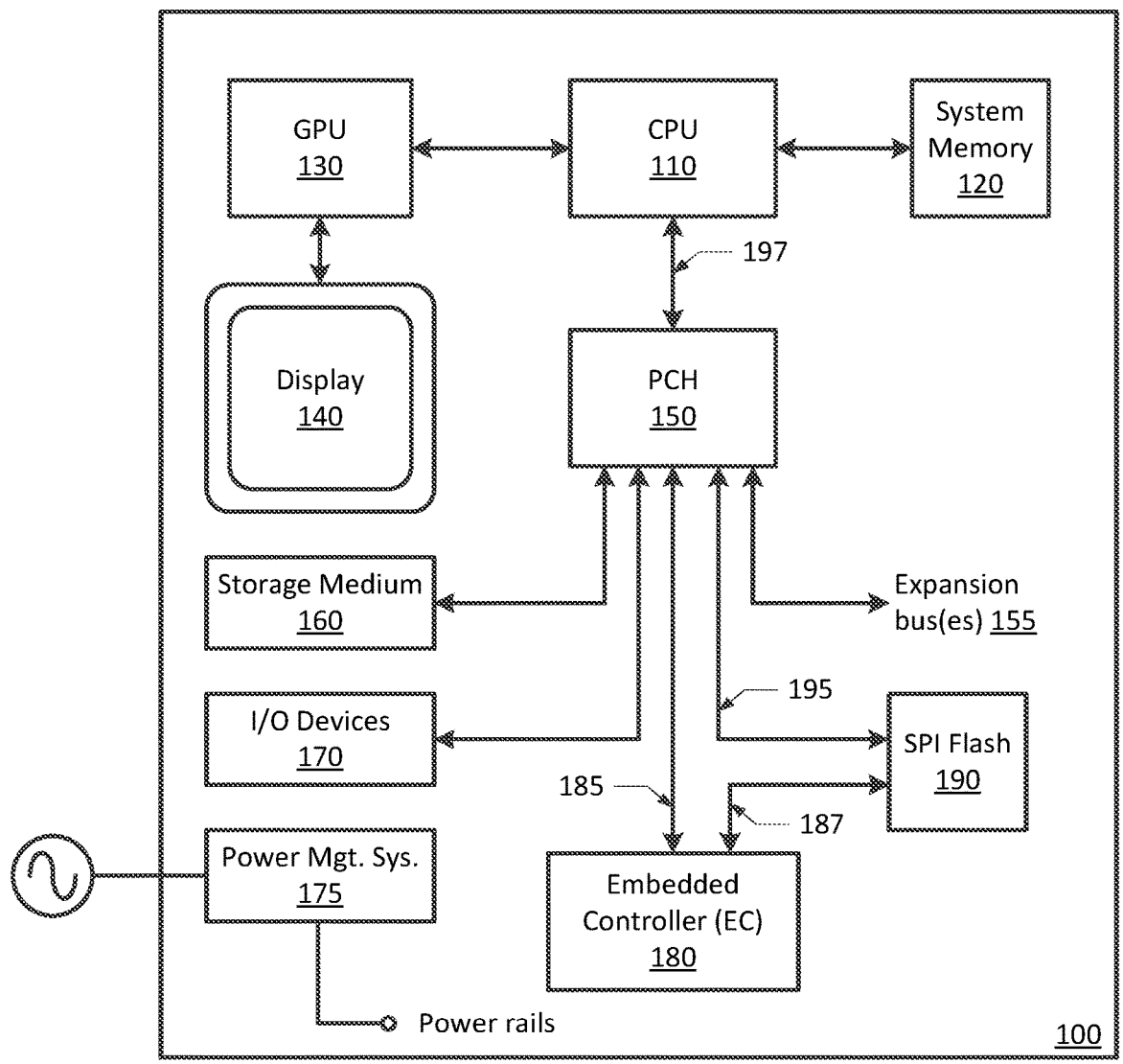
FIG. 1 is a block diagram illustrating one embodiment of an information handling system including a central processing unit (CPU), platform controller hub (PCH), embedded controller (EC) and a Flash memory device.

While the present disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the present disclosure is to cover all modifications, equivalents and alternatives falling within the spirit and scope of the present disclosure as defined by the appended claims.

DESCRIPTION OF ILLUSTRATIVE EMBODIMENTS

FIG. 1 is a block diagram of an information handling system 100 (e.g., a desktop computer, laptop computer, tablet computer, MP3 player, personal data assistant (PDA), cell phone, etc.) as it may be configured according to one embodiment of the present disclosure. In this regard, it should be understood that the configuration of FIG. 1 is exemplary only, and that the disclosed methods may be implemented on other types of information handling systems. It should be further understood that while certain components of an information handling system are shown in FIG. 1 for illustrating embodiments of the present disclosure, the information handling system is not restricted to including only those components shown in FIG. 1 and described below.

As shown in FIG. 1, information handling system (IHS) 100 may generally include one or more processing devices, such as a central processing unit (CPU) 110 for executing an operating system (OS) for system 100. CPU 110 may include any type of processing device, such as an Intel Pentium series processor, an Advanced Micro Devices (AMD) processor, an ARM processor, or another processing device.

CPU 110 is coupled to system memory 120, which may include, for example, random access memory (RAM), read only memory (ROM), dynamic RAM (DRAM), synchronous DRAM (SDRAM), and other suitable storage mediums. When the information handling system is initially powered on or rebooted, a boot process is initiated to load boot firmware (e.g., BIOS or UEFI) into system memory 120. The boot firmware is executed by CPU 110 to configure hardware components of the information handling system, perform a Power-On Self-Test (POST) to ensure the hardware configuration is valid and working properly, discover and initialize devices, and launch a bootloader to load the operating system into system memory 120.

Graphics processor unit (GPU) 130 is coupled to CPU 110 and configured to coordinate communication between the CPU and one or more display components of the IHS. In the embodiment shown in FIG. 1, GPU 130 is coupled to display device 140 to provide visual images (e.g., a graphical user interface, static images and/or video content) to the user. In some embodiments, GPU 130 may be coupled to one or more display ports to support additional display functions. Although GPU 130 is shown as a separate processing device in the embodiment of FIG. 1, GPU 130 may be omitted in other embodiments, when the functionality provided thereby is integrated within CPU 110 in a system-on-chip (SoC) design. In some embodiments, IHS 100 may include other types of processing devices including, but not limited to, a graphics-derivative processor (such as a physics/gaming processor), a digital signal processor (DSP), etc.

Platform controller hub (PCH) 150 (otherwise referred to as a southbridge controller or chipset) is coupled to CPU 110 and configured to control certain data paths and manage information flow between components of the information handling system. As such, PCH 150 may include one or more integrated controllers or interfaces for controlling the data paths connecting PCH 150 with CPU 110, GPU 130, expansion bus(es) 155, computer readable storage medium 160, input/output (I/O) devices 170, embedded controller (EC) 180 and SPI Flash memory device 190. For example, PCH 150 may include one or more of the following: a Serial Peripheral Interface (SPI) controller, an Enhanced Serial Peripheral Interface (eSPI) controller, a Peripheral Controller Interconnect (PCI) controller, a PCI-Express (PCIe) controller, a low pin count (LPC) controller, a Small Computer Serial Interface (SCSI), an Industry Standard Architecture (ISA) interface, an Inter-Integrated Circuit (I²C) interface, a Universal Serial Bus (USB) interface and a Thunderbolt™ interface. Examples of expansion bus(es) 155 that may be coupled to PCH 150 include, but are not limited to, a PCI bus, a PCIe bus, a SATA bus, a USB bus, etc.

In one embodiment, PCH 150 may include a Serial Peripheral Interface (SPI) controller for managing information flow between PCH 150, CPU 110 and SPI Flash 190 and an Enhanced Serial Peripheral Interface (eSPI) controller for managing information flow between PCH 150 and EC 180. SPI and eSPI are bus interfaces that enable exchange of data between a master device and a slave device. In SPI, data is exchanged over an SPI bus between a master device (e.g., PCH 150) and a slave device (e.g., CPU 110 and SPI Flash 190). The eSPI bus interface enables eSPI master and slave devices to access shared SPI devices, such as a SPI Flash 190. In eSPI, a slave device (e.g., EC 180) may request a master device (e.g., PCH 150) to perform operations on the shared SPI device (e.g., SPI Flash 190) on behalf of the slave device. In the embodiment shown in FIG. 1, PCH 150 is coupled to EC 180 via eSPI bus 185, coupled to SPI Flash 190 via SPI bus 195, and coupled to CPU 110 via a high-speed interface bus 197 (e.g., a Front Side Bus, FSB).

Computer readable storage medium 160 is coupled to PCH 150 to provide non-volatile storage for information handling system 100. In general, computer readable storage medium 160 may be configured to store software and/or data, and may be any type of persistent, non-transitory computer readable storage medium, such as one or more hard disk drives (HDDs) or solid-state drives (SSDs).

I/O devices 170 are coupled to PCH 150 to enable the user to interact with IHS 100, and to interact with application programs or other software/firmware executing thereon. In some embodiments, one or more I/O devices 170 may be present within, or coupled to, IHS 100. In some embodiments, I/O device(s) 170 may be separate from the IHS and may interact with the IHS through a wired or wireless connection. Examples of I/O devices 170 include, but are not limited to, keyboards, keypads, touch screens, scanning devices, voice or optical recognition devices, and any other devices suitable for entering or retrieving data.

IHS 100 requires a power source to operate the various electronic components disposed therein. The power source can be provided via an external power source (e.g., mains power) and an internal power supply regulator, and/or by an internal power source, such as a battery. As shown in FIG. 1, power management system 175 may be included within IHS 100 for moderating the available power from a power source. In one embodiment, power management system 175 may be coupled to provide operating voltages on one or more power rails to one or more components of the information handling system 100 (such as, e.g., processor 110, PCH 150, EC 180 and other IHS components), as well as to perform other power-related administrative tasks of the information handling system.

Figure 2:
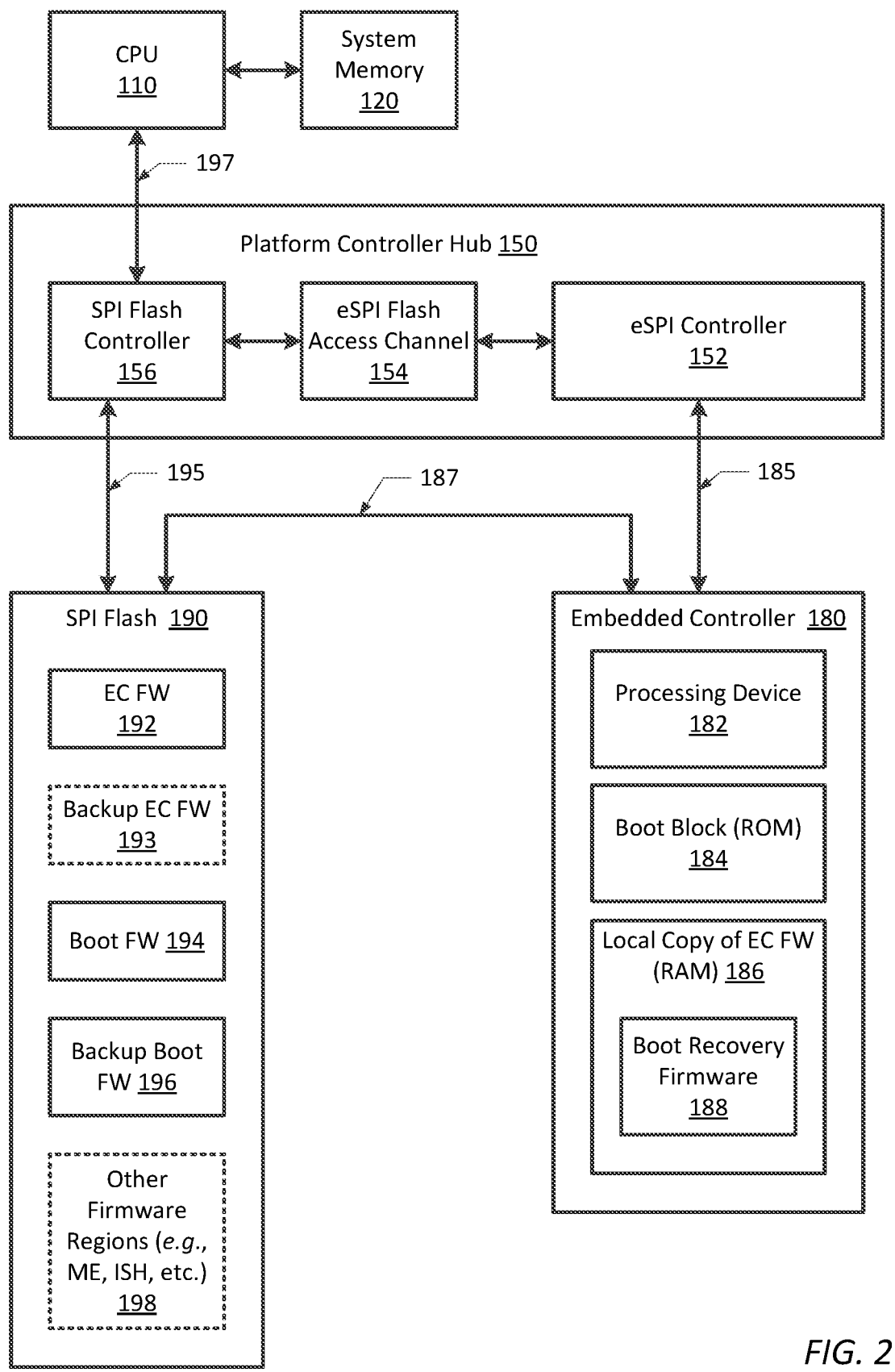
FIG. 2 is a block diagram of the CPU, PCH, EC and Flash memory device shown in FIG. 1.

Embedded controller (EC) 180 is coupled to PCH 150 and SPI Flash 190, and is generally configured to boot the information handling system and perform other functions for the information handling system. As shown in FIG. 1, EC 180 is coupled to PCH 150 via eSPI bus 185 and is coupled to SPI Flash 190 via SPI bus 187. As shown in FIG. 2, EC 180 may include read only memory (ROM), random access memory (RAM) and a processing device for executing program instructions stored within its internal ROM and RAM. For example, EC 180 may be configured to execute program instructions (e.g., boot block 184) stored ROM to initiate a boot process for the information handling system, retrieve EC application firmware (e.g., EC FW 192) from SPI Flash 190, store a local copy of the EC application firmware 186 in RAM, and execute the EC application firmware 186.

SPI Flash 190 is coupled to PCH 150 and EC 180, and is generally configured to store EC application firmware (e.g., EC FW 192) and boot firmware (e.g., Boot FW 194 and Backup Boot FW 196), in addition to other software and/or firmware modules. As shown in FIG. 1, SPI Flash 190 is directly connected to PCH 150 via SPI bus 195. In addition, SPI Flash 190 is directly connected to EC 180 via SPI bus 187. By "directly connecting" EC 180 to SPI Flash 190, SPI bus 187 provides a conduit through which EC 180 may access the SPI Flash 190 without the assistance of, or permission from, PCH 150.

EC 180 is provided direct access to SPI Flash 190 over SPI bus 187 while PCH 150 and CPU 110 are in reset. Once PCH 150 comes out of reset, the PCH assumes control of SPI Flash 190 and provides shared memory access to EC 180 and CPU 110 in a Master Attached Flash (MAF) configuration. When configured in MAF, PCH 150 (i.e., the eSPI master) has direct access to SPI Flash 190 and provides EC 180 (i.e., the eSPI slave) shared access to SPI Flash 190 via eSPI bus 185, SPI bus 195 and various interface and logic blocks included within the PCH. In addition, CPU 110 is provided with shared access to SPI Flash 190 via high speed interface bus 197, SPI bus 195 and various interface and logic blocks included within the PCH. When acting as the eSPI master, PCH 150 enforces SPI Flash access protections, which prevent slave devices (such as EC 180 and CPU 110) from accessing all regions of the SPI Flash 190.

Additional details describing how EC 180 and PCH 150 may share direct access to SPI Flash 190 may be found in co-pending U.S. application Ser. No. 15/922,694, which is entitled "Securely Sharing a Memory between an Embedded Controller (EC) and a Platform Controller Hub (PCH)", filed on Mar. 15, 2018 and incorporated herein in its entirety. In the co-pending application, the SPI bus directly connecting the EC to the SPI Flash is closed or blocked before the EC begins executing the EC application firmware stored locally in internal RAM and before the PCH and CPU are released from reset. In the present disclosure, however, the SPI bus 187 directly connecting EC 180 to SPI Flash 190 remains open while EC executes the EC application firmware 186 stored locally in internal RAM and closes before the PCH and CPU are released from reset.

FIG. 2 is a block diagram illustrating additional details of the CPU 110, PCH 150, EC 180 and SPI Flash 190 shown in FIG. 1. As shown in FIG. 2, PCH 150 may generally include an eSPI controller 152, an eSPI Flash Access Channel 154 and an SPI Flash controller 156. In this configuration, EC 180 is coupled to the eSPI interface 152 of PCH 150 via eSPI bus 185, and CPU 110 is coupled to SPI Flash controller 156 of PCH 150 via high-speed interface bus 197. As described in more detail below, EC 180 may access SPI Flash 190 directly via SPI bus 187 while PCH 150 and CPU 110 are in reset. When the PCH comes out of reset and assumes control of SPI Flash 190 as a MAF, EC 180 is provided only indirect access to SPI Flash 190 through eSPI Controller 152, eSPI Flash access channel 154, SPI Flash controller 156 and SPI bus 195. Likewise, CPU 110 is provided only indirect access to SPI Flash 190 through SPI Flash controller 156 and SPI bus 195. In some embodiments, a CPU containing SBIOS may have limited access to SBIOS regions within SPI Flash 190. The address protection in this case would be within Flash controller 156.

As shown in FIG. 2, SPI Flash 190 may be configured to store EC application firmware 192, boot firmware 194 and backup boot firmware 196, in one embodiment. The boot firmware 194 and backup boot firmware 196 stored within SPI Flash 190 may include system BIOS firmware and/or UEFI firmware. In some embodiments, boot firmware 194 (e.g., a "main BIOS image") may include the entire contents of the system BIOS firmware, and backup boot firmware 196 (e.g., a "recovery BIOS image") may be a substantially identical copy of boot firmware 194. In some embodiments, a backup copy of the EC application firmware (Backup EC FW) 193 and/or other firmware regions 198 (such as, e.g., Management Engine (ME) FW and Integrated Sensor Hub (ISH) FW) may also be stored in SPI Flash 190.

EC 180 includes read only memory (ROM) for storing boot block 184, random access memory (RAM) for storing a local copy of EC application firmware 186, and processing device 182 for executing the program instructions stored locally in ROM and RAM. Although not strictly limited to such, processing device 182 may be implemented as a programmable integrated circuit (e.g., a controller, microcontroller, microprocessor, ASIC, etc., or as a programmable logic device "PLD" such as FPGA, complex programmable logic device "CPLD", etc.), in one embodiment.

Upon system start-up or reboot, processing device 182 of EC 180 may initiate a boot process for the information handling system by executing the boot block 184 stored within the EC ROM while PCH 150 and CPU 110 are in reset. As used herein, a "boot process" is a process or set of operations performed by an information handling system component (e.g., EC 180) to load and execute a boot system and prepare the system for OS booting. An exemplary boot process performed by EC 180 at system start-up or reboot is described in more detail below. Such a boot process may be referred to as a "cold boot" when the information handling system is booted from a mechanical off (G3) state, or soft off state.

In some embodiments, processing device 182 may execute program instructions within boot block 184 to retrieve the EC application firmware (EC FW) 192, or a backup copy of the EC application firmware (Backup EC FW) 193, from SPI Flash 190. In some embodiments, processing device 182 may execute program instructions within boot block 184 to check the integrity of the EC application firmware (EC FW) 192 stored in SPI Flash 190. If the integrity check returns no errors, indicating that EC FW 192 is undamaged, EC 180 may retrieve the EC FW 192 stored in SPI Flash 190, and store a local copy of the EC application firmware 186 in EC RAM. However, if the integrity check determines that EC FW 192 damaged or corrupt, EC 180 may retrieve the backup copy of the EC application firmware (Backup EC FW) 193 stored in SPI Flash 190 and store a local copy of the EC application firmware 186 in EC RAM.

While PCH 150 and CPU 110 are in reset, EC 180 has direct access to SPI Flash 190 via SPI bus 187. The direct access afforded to EC 180 allows the EC to execute boot block 184, retrieve EC application firmware 192 (or backup EC FW 193, if EC FW 192 is damaged or corrupt) from SPI Flash 190 via SPI bus 187, and store a local copy of the EC application firmware 186 in internal RAM without waiting for the PCH to come out of reset. Once a local copy of the EC application firmware 186 is stored in EC RAM, processing device 182 may begin executing program instructions within EC application firmware 186 before PCH 150 and CPU 110 come out of reset, and before the boot firmware 194 stored in SPI Flash 190 is fetched and executed by CPU 110 to continue the boot process.

In some cases, errors in the boot process (or in a previous boot process) may cause the boot system to fail. As noted above, a boot failure may occur when the boot block stored in ROM and/or the boot firmware stored in Flash memory is missing, misconfigured or corrupt. In some cases, the boot firmware 194 stored in SPI Flash 190 may be damaged or corrupt if the payload has been tampered with (i.e., as a result of a hacking attempt), as a result of an unsuccessful update made to SPI Flash 190, or as a result of bit-rot on the SPI Flash 190 (i.e., an unexpected bit flip at the silicon level). If the boot firmware 194 stored in SPI Flash 190 is damaged or corrupt, EC 180 and CPU 110 may fail to boot the information handling system and the system may be left in a hung state. To avoid such a problem, a boot recovery system is generally needed to recover the boot system by replacing the damaged boot firmware with an undamaged copy.

Generally speaking, the present disclosure provides an improved boot recovery system and method to restore the boot system when the boot firmware 194 stored in SPI Flash 190 is damaged or corrupt. Unlike conventional boot recovery systems and methods, the improved boot recovery system and method is able to restore the entire boot firmware region within SPI Flash 190 without the need for user intervention (e.g., without requiring a user to press a Hot key, change a jumper or insert a USB key). In addition, the improved boot recovery system and method disclosed herein is chipset independent, does not require any changes to the boot system code or any additional hardware, and does not store the backup boot firmware in an internal or external storage device (e.g., a HDD, SDD, controller, or USB storage device), which is separate and distinct from the SPI Flash 190. By moving the boot recovery process from CPU 110 to EC 180, the improved boot recovery system and methods disclosed herein enable the main processing unit to be recovered (in the event that the CPU firmware is corrupt or compromised), and moves the security attack vector from the CPU to the EC, which is better protected against attacks.

In the present disclosure, a backup copy of the boot firmware 196 is stored in SPI Flash 190 along with EC FW 192 and boot firmware 194. The backup boot firmware 196 stored within SPI Flash 190 is substantially identical to boot firmware 194, and may be used to replace the entire boot firmware 194 region if boot firmware 194 is damaged or corrupt. In addition to storing a full backup copy 196 of the boot firmware in SPI Flash 190, the present disclosure includes program instructions within EC application firmware 192 (and in Backup EC FW 193) that may be used to restore the boot system if boot firmware 194 is damaged or corrupt. Once EC application firmware 192 (or Backup EC FW 193) is retrieved, and a local copy of the EC application firmware 186 is stored in EC RAM, program instructions within the EC application firmware 186 (e.g., boot recovery firmware 188) may be executed by processing device 182 to recover the boot system (if need be) before PCH 150 and CPU 110 come out of reset, and before CPU 110 begins executing the boot firmware code out of SPI Flash 190.

In some embodiments, boot recovery firmware 188 may be triggered to recover the boot system upon: receiving a command or flag from another information handling system component, detecting a Hot key trigger, or detecting a timer (e.g., a watchdog timer) expiration indicating that a problem has occurred with the boot process. Once triggered, boot recovery firmware 188 may recover the boot system by copying contents of the backup boot firmware 196 region into the boot firmware 194 region of SPI Flash 190.

In some embodiments, boot recovery firmware 188 may be executable to perform an integrity check on boot firmware 194 to determine if the boot firmware payload is damaged or corrupt. In one embodiment, boot recovery firmware 188 may check the integrity of boot firmware 194 by applying a cryptographic hash function (such as, e.g., SHA 256) on the boot firmware 194 payload. If an error is detected, boot recovery firmware 188 may recover the boot system by copying contents of the backup boot firmware 196 region into the boot firmware 194 region of SPI Flash 190.

In some embodiments, boot recovery firmware 188 may be executable to check the integrity of other firmware regions 198 within SPI Flash 190 and to recover one or more of such regions if they are determined to be damaged or corrupt. In one embodiment, boot recovery firmware 188 may check the integrity of one or more of the other firmware regions 198 by applying a cryptographic hash function (such as, e.g., SHA 256) on the payload of firmware regions 198. If an error is detected in one or more firmware regions 198, boot recovery firmware 188 may recover the affected firmware regions 198 by copying contents of backup firmware into the affected firmware region 198 of SPI Flash 190. The backup firmware for the other firmware regions 198 may be stored in SPI Flash 190 or another non-volatile memory accessible by EC 180.

As noted above, boot recovery firmware 188 may be executed by processing device 182 (if need be) to recover the boot system (and potentially other firmware regions 198 within SPI Flash 190) before PCH 150 and CPU 110 come out of reset and before CPU 110 begins executing the boot firmware code out of SPI Flash 190. Since EC 180 is provided direct access to SPI Flash 190 via SPI bus 187 while the PCH is in reset, the EC is able to bypass security provisions within the PCH that would limit the EC to accessing only its own regions (i.e., EC FW 192 and Backup EC FW 193) and prevent the EC from accessing other regions of the SPI Flash 190 (such as Boot FW 194, Backup Boot FW 196 and other firmware regions 198). By using SPI bus 187 to access SPI Flash 190 first, before the PCH comes out of reset, EC 180 is able to access all regions of SPI Flash 190 without the assistance or permission from PCH 150 to do so. The direct access provided by SPI bus 187 enables the boot recovery firmware 188 to recover the boot system (and possibly other firmware regions 198) before the PCH and CPU are fully up and running. Because the EC is executing trusted code when the EC has full access to the SPI Flash, there is no concern, from a security standpoint, when the trusted code is running.

When PCH 150 comes out of reset and assumes control of SPI Flash 190 as a MAF, PCH 150 has direct access to, and control of, SPI Flash 190 via SPI bus 195 and provides shared memory access to EC 180 and CPU 110. Once the PCH assumes control, EC 180 is provided indirect access to SPI Flash 190 through eSPI bus 185, eSPI interface controller 152, eSPI Flash access channel 154, SPI Flash controller 156 and SPI bus 195. Likewise, CPU 110 is provided indirect access to SPI Flash 190 through high speed bus 197, SPI Flash controller 156 and SPI bus 195.

When CPU 110 comes out of reset, CPU 110 may send an access request to SPI Flash controller 156 to fetch the boot firmware 194 stored within SPI Flash 190 on behalf of the CPU. Once fetched, program instructions within boot firmware 194 may be executed by CPU 110 to configure hardware components of the information handling system, perform a Power-On Self-Test (POST) to ensure the hardware configuration is valid and working properly, discover and initialize devices and launch a bootloader to load an operating system (OS) for the information handling system. In some embodiments, CPU 110 may begin executing boot firmware 194 out of SPI Flash 190 while the boot firmware is being copied into system memory 120, and may continue executing the boot firmware from system memory 120 once copying is complete. In some embodiments, the SPI bus 187 directly connecting EC 180 and SPI Flash 190 may be closed or blocked by hardware (e.g., a multiplexer, counter, flip-flop and/or latch) and/or by program instructions before CPU 110 begins executing the boot firmware 194 out of SPI Flash 190.

As set forth above, EC 180 and PCH 150 are each provided direct access to SPI Flash 190 at different times during the boot process. For example, EC 180 is provided direct access to SPI Flash 190 first before the PCH comes out of reset and assumes control of the SPI Flash as a MAF. Since EC 180 is provided access to SPI Flash 190 first, the EC has access to all regions of the SPI Flash (including Boot FW 194, Backup Boot FW 196 and other firmware regions 198), and thus, is able to perform the recovery methods disclosed herein before the PCH and CPU are fully up and running. Once the SPI bus 187 directly connecting EC 180 and SPI Flash 190 is closed, PCH 150 has direct access to the SPI Flash and provides shared memory access to EC 180 and CPU 110.

Unlike conventional information handling systems, the present disclosure stores a full backup copy 196 of the boot firmware 194 in the SPI Flash 190, moves the recovery agent role from the CPU domain to the EC domain, and provides a conduit (SPI bus 187) through which EC 180 may directly access SPI Flash 190 to perform the recovery process while PCH 150 and CPU 110 are in reset. This enables EC 180 to restore the entire boot firmware region within SPI Flash 190 (if boot firmware 194 is damaged or corrupt) without the need for user intervention (e.g., without requiring a user to press a Hot key, change a jumper or insert a USB key), changes to boot firmware code or additional hardware.

Figure 3:
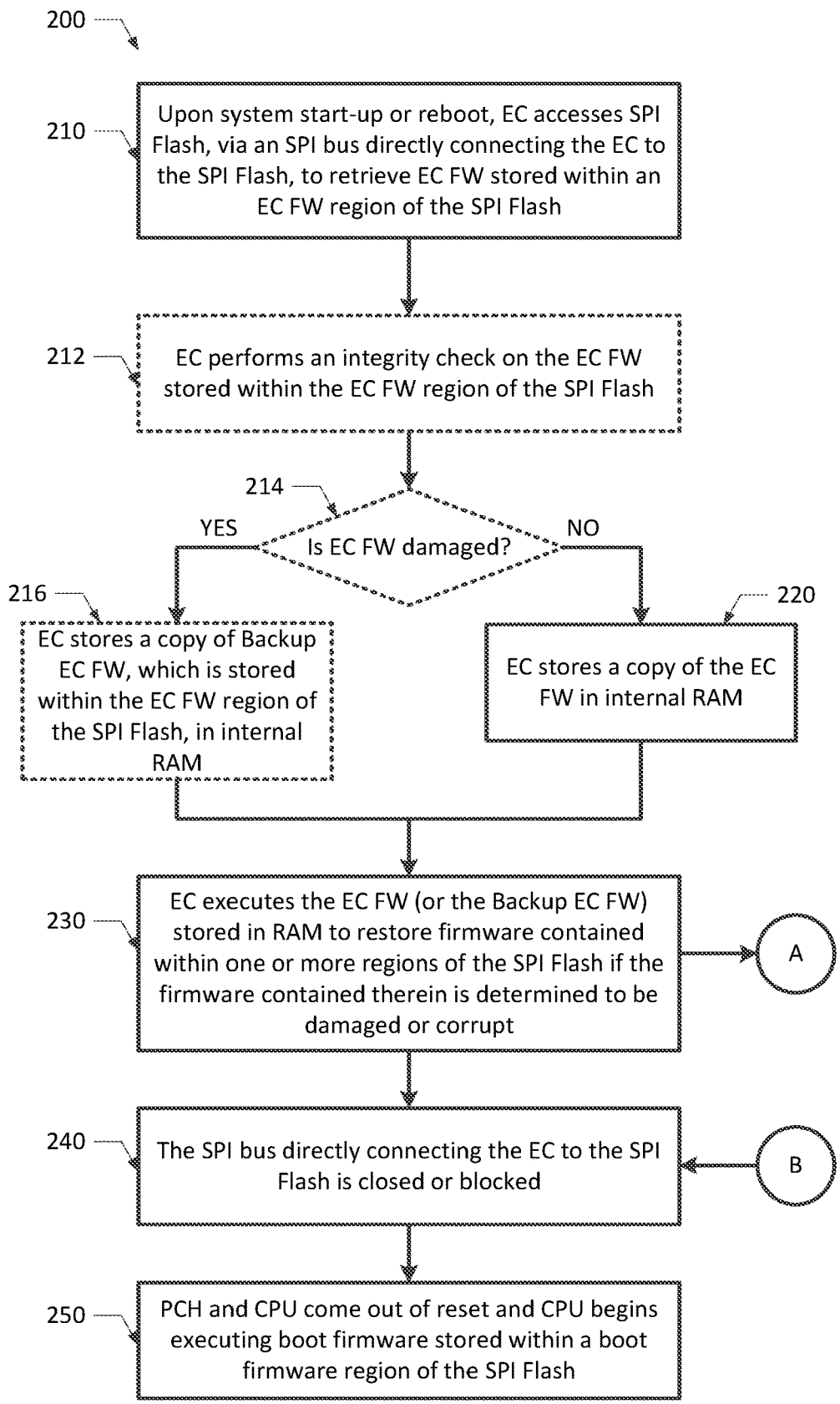
FIG. 3 is a flowchart diagram of a method that may be used to restore firmware contained within one or more regions of a Flash memory device.
Figure 4:
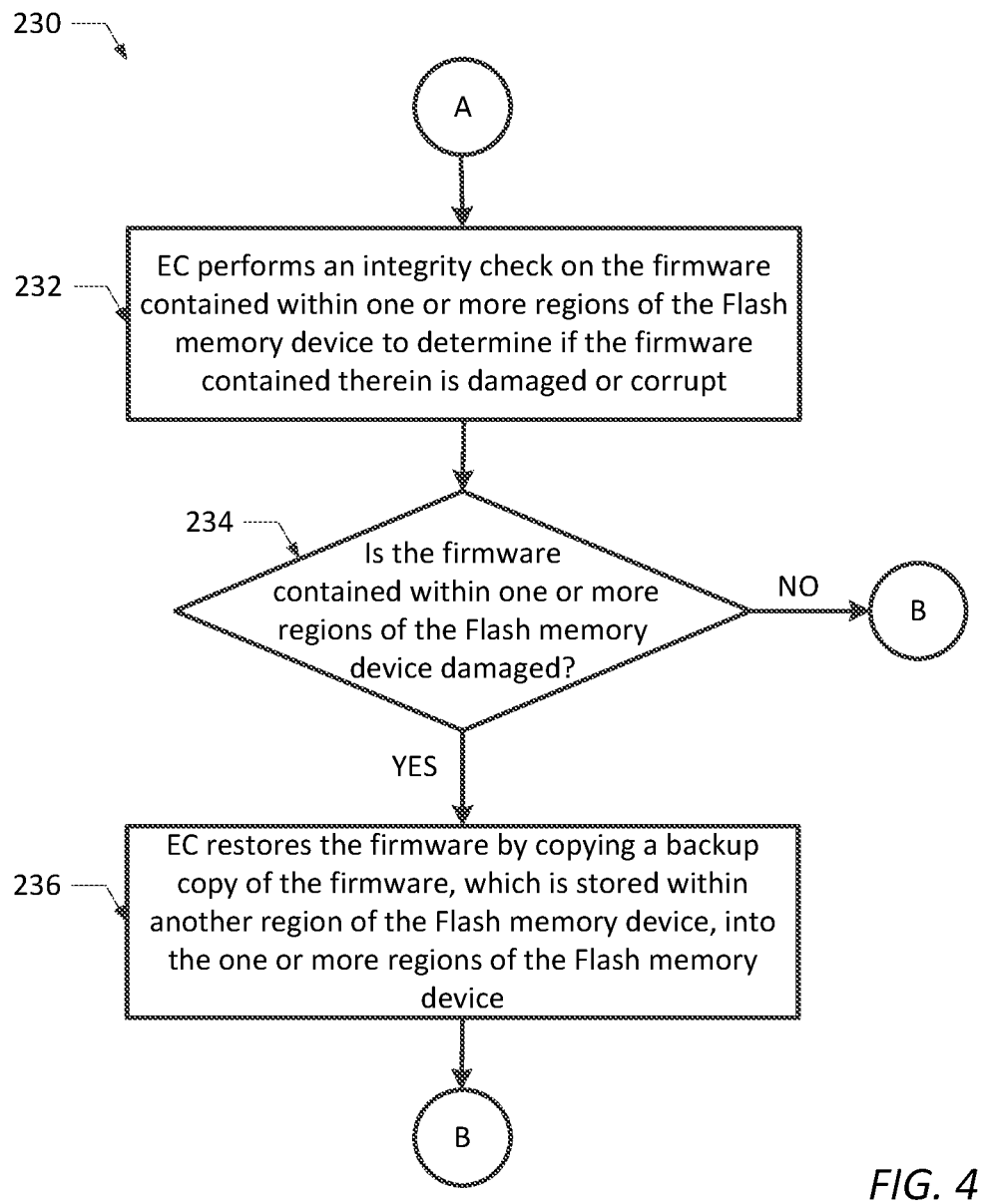
FIG. 4 is a flowchart diagram illustrating how damaged or corrupt firmware may be detected and restored, according to one embodiment.

FIGS. 3 and 4 illustrate embodiments of a method 200, which may be performed during an information handling system (IHS) boot process to restore firmware contained within one or more regions of a Flash memory device (e.g., SPI Flash 190). The method shown in FIGS. 3 and 4 is a computer implemented method performed, at least in part, by an embedded controller (e.g., EC 180) of an information handling system (e.g., IHS 100). According to one example implementation, processing device 182 of EC 180 may perform various method steps shown in FIGS. 3 and 4 by executing program instructions stored within internal ROM (e.g., boot block 184) and internal RAM (e.g., boot recovery firmware 188). Unlike conventional information handling systems, the computer implemented methods shown in FIGS. 3 and 4 may be used to improve the way in which an information handling system functions, in one respect, by enabling the embedded controller to restore firmware contained within one or more regions of a Flash memory device without the need for user intervention (e.g., without requiring a user to press a Hot key, change a jumper or insert a USB key), changes to boot firmware code or additional hardware.

According to one embodiment, method 200 may generally begin upon system start-up or reboot when EC 180 executes program instructions (e.g., boot block 184) stored within the EC ROM to begin a boot process for the information handling system. As noted above, EC 180 may initiate the boot process while a platform controller hub (e.g., PCH 150) and a central processing unit (e.g., CPU 110) of the IHS are in reset.

In step 210, EC 180 accesses Flash memory device (e.g., SPI Flash 190) via a Serial Peripheral Interface bus (e.g., SPI bus 187), which directly connects the EC to the Flash memory device, to retrieve a copy of EC application firmware (e.g., EC FW 192) stored within an EC firmware region of the Flash memory device. In some embodiments, EC 180 may store the copy of the EC application firmware (e.g., a local copy of EC FW 186) in internal RAM (in step 220), and may execute the copy of the EC application firmware stored in RAM to restore firmware contained within one or more regions of the Flash memory device if the firmware contained therein is damaged or corrupt (in step 230). If the firmware is damaged or corrupt, EC 180 may restore the firmware (in step 230) by copying a backup copy of the firmware, which is stored within another region of the Flash memory device, into the one or more regions of the Flash memory device.

As noted above, EC 180 may access the Flash memory device (in step 210) via SPI bus 187, store a local copy of the EC application firmware (in step 220) and execute the local copy of the EC application firmware (in step 230) to restore the firmware (if need be) before PCH 150 comes out of reset and assumes control of the Flash memory device. In step 240, the SPI bus (e.g., SPI bus 187) directly connecting the EC to the Flash memory device may be closed or blocked before the PCH 150 and CPU 110 come out of reset, and before the CPU begins executing the boot firmware within the boot firmware region of the Flash memory device (in step 250).

In some embodiments, EC 180 may determine whether or not the EC application firmware (e.g., EC FW 192) stored within the EC firmware region of the Flash memory device is damaged prior to storing a local copy of the EC application firmware (e.g., EC FW 186) in EC RAM (in step 220). For example, EC 180 may execute program instructions (e.g., boot block 184) stored within the EC ROM to perform an integrity check on the EC application firmware (e.g., EC FW 192) stored within the EC firmware region of the Flash memory device (in step 212) before retrieving a copy of EC application firmware. If the integrity check determines that the EC application firmware 192 is damaged or corrupt (YES branch of step 214), EC 180 may access the Flash memory device, via the SPI bus, to retrieve a backup copy of the EC application firmware (e.g., Backup EC FW 193) from the Flash memory device, and store the backup copy of the EC application firmware in RAM (in step 216). If the backup copy of the EC application firmware (e.g., Backup EC FW 193) is stored in RAM, EC 180 may execute the backup copy of the EC application firmware to restore firmware contained within one or more regions of the Flash memory device if the firmware contained therein is damaged or corrupt (in step 230).

In some embodiments, EC 180 may execute program instructions (e.g., boot recovery firmware 188) stored within the EC RAM to restore firmware contained within one or more regions of the Flash memory device (in step 230) upon receiving or detecting a trigger from an external source. For example, EC 180 may be triggered to execute boot recovery firmware 188 upon: receiving a command or a flag from another information handling system component, detecting a Hot key trigger, or detecting a timer expiration indicating that a problem has occurred with the boot process.

In other embodiments, EC 180 may execute program instructions (e.g., boot recovery firmware 188) stored within the EC RAM to perform an integrity check on the firmware contained within one or more regions of the Flash memory device to determine if the firmware contained therein is damaged or corrupt (in step 232 of FIG. 4). In one example implementation, EC 180 may perform an integrity check by applying a cryptographic hash function to the firmware contained within one or more regions of the Flash memory device. If the integrity check does not return an error, indicating that the firmware is undamaged (NO branch of step 234), there is no need to restore the firmware, and the method may proceed via path B to step 240. If the integrity check returns an error, indicating that the firmware contained within one or more regions of the Flash memory device is damaged or corrupt (YES branch of step 234), EC 180 may restore the firmware by copying a backup copy of the firmware, which is stored within another region of the Flash memory device, into the one or more regions of the Flash memory device (in step 236).

In some embodiments, EC 180 may execute program instructions (e.g., boot recovery firmware 188) stored within the EC RAM to restore boot firmware (e.g., Boot FW 194) stored within a boot firmware region of the Flash memory device, if the boot firmware is determined to be damaged or corrupt. If the boot firmware is damaged or corrupt, EC 180 may execute boot recovery firmware 188 to restore the boot firmware (e.g., by copying Backup Boot FW 196 into the Boot FW 194 region of SPI Flash 190) before CPU 110 begins executing the boot firmware within the boot firmware region of the Flash memory device. In other embodiments, EC 180 may execute boot recovery firmware 188 to restore firmware within other regions 198 of the Flash memory device.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

It will be understood that one or more of the tasks, functions, or methodologies described herein may be implemented, for example, as firmware or as a computer program of instructions embodied in a non-transitory tangible computer readable medium that is executed by a CPU, embedded controller, microcontroller, processor, microprocessor, FPGA, ASIC, or other suitable processing device.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An information handling system (IHS), comprising:
   a platform controller hub (PCH);
   an embedded controller (EC) including a processing device, read only memory (ROM) and random access memory (RAM), wherein the processing device is configured to execute a boot block stored in ROM to initiate a boot process for the IHS;
   a Flash memory device storing EC application firmware, boot firmware and backup boot firmware, which is identical to the boot firmware; and
   a Serial Peripheral Interface (SPI) bus that directly connects the EC to the Flash memory device during a portion of the boot process when the PCH is in reset; and
   wherein the EC is configured to bypass the PCH and directly access the Flash memory device via the SPI bus while the PCH is in reset to retrieve the EC application firmware from the Flash memory device, store a local copy of the EC application firmware in RAM and execute the local copy of the EC application firmware.

2. The information handling system as recited in claim 1, wherein the local copy of the EC application firmware stored in RAM comprises boot recovery firmware, which is executable by the processing device to restore the boot firmware if the boot firmware is determined to be damaged or corrupt.

3. The information handling system as recited in claim 2, wherein the boot recovery firmware is executable by the processing device to restore the boot firmware upon: receiving a command or a flag from another information handling system component, detecting a Hot key trigger, or detecting a timer expiration indicating that a problem has occurred with the boot process.

4. The information handling system as recited in claim 2, wherein the boot recovery firmware is executable by the processing device to:
   perform an integrity check on the boot firmware stored in the Flash memory device to determine if the boot firmware is damaged or corrupt; and
   restore the boot firmware if the integrity check returns an error.

5. The information handling system as recited in claim 4, wherein the boot recovery firmware is executable to perform the integrity check by applying a cryptographic hash function to a payload of the boot firmware.

6. The information handling system as recited in claim 2, wherein the boot recovery firmware is executable by the processing device to restore the boot firmware by copying contents of a region of the Flash memory device comprising backup boot firmware into a region of the Flash memory device comprising the boot firmware.

7. The information handling system as recited in claim 2, wherein the boot recovery firmware is executable by the processing device to check the integrity of other firmware regions within the Flash memory device and to restore one or more of the other firmware regions if they are damaged or corrupt.

8. The information handling system as recited in claim 2, wherein the boot recovery firmware is executable by the processing device to restore the boot firmware, if the boot firmware is damaged or corrupt, before the PCH comes out of reset and before a central processing unit (CPU) of the IHS begins executing the boot firmware stored in the Flash memory device.

9. The information handling system as recited in claim 2, wherein SPI bus directly connecting the EC to the Flash memory device is closed before a central processing unit (CPU) of the IHS begins executing the boot firmware stored in the Flash memory device.

10. A method performed by an embedded controller (EC) of an information handling system (IHS) during a boot process to restore firmware contained within one or more regions of a Flash memory device of the IHS, the method comprising:
    accessing the Flash memory device via a Serial Peripheral Interface (SPI) bus, which directly connects the EC to the Flash memory device, to retrieve a copy of EC application firmware stored within an EC firmware region of the Flash memory device;
    storing the copy of the EC application firmware in random access memory (RAM); and
    executing the copy of the EC application firmware stored in RAM to restore firmware contained within one or more regions of the Flash memory device if the firmware contained therein is determined to be damaged or corrupt.

11. The method as recited in claim 10, wherein the embedded controller performs said accessing, storing and executing before a platform controller hub (PCH) of the IHS comes out of reset and assumes control of the Flash memory device.

12. The method as recited in claim 10, wherein the embedded controller performs said executing upon: receiving a command or a flag from another information handling system component, detecting a Hot key trigger, or detecting a timer expiration indicating that a problem has occurred with the boot process.

13. The method as recited in claim 10, wherein said executing comprises:
  performing an integrity check on the firmware contained within one or more regions of the Flash memory device to determine if the firmware contained therein is damaged or corrupt; and
  restoring the firmware if the integrity check returns an error.

14. The method as recited in claim 13, wherein said performing an integrity check comprises applying a cryptographic hash function to the firmware contained within one or more regions of the Flash memory device.

15. The method as recited in claim 10, wherein if the firmware contained within one or more regions of the Flash memory device is determined to be damaged or corrupt, the embedded controller restores the firmware by copying a backup copy of the firmware, which is stored within another region of the Flash memory device, into the one or more regions of the Flash memory device.

16. The method as recited in claim 10, wherein the embedded controller performs said executing to restore boot firmware, which is stored within a boot firmware region of the Flash memory device, if the boot firmware is determined to be damaged or corrupt.

17. The method as recited in claim 16, wherein the embedded controller performs said executing to restore the boot firmware, if the boot firmware is determined to be damaged or corrupt, before a central processing unit (CPU) of the IHS begins executing the boot firmware within the boot firmware region of the Flash memory device.

18. The method as recited in claim 16, further comprising closing the SPI bus directly connecting the EC to the Flash memory device before a central processing unit (CPU) of the IHS begins executing the boot firmware within the boot firmware region of the Flash memory device.

19. The method as recited in claim 10, further comprising performing an integrity check on the EC application firmware stored within the EC firmware region of the Flash memory device before retrieving the copy of EC application firmware.

20. The method as recited in claim 19, wherein if the integrity check determines that the EC application firmware is damaged or corrupt, the method further comprises:
  accessing the Flash memory device, via SPI bus, to retrieve a backup copy of the EC application firmware from the Flash memory device;
  storing the backup copy of the EC application firmware in RAM; and
  executing the backup copy of the EC application firmware stored in RAM to restore firmware contained within one or more regions of the Flash memory device if the firmware contained therein is determined to be damaged or corrupt.

21. An information handling system (IHS), comprising:
  a platform controller hub (PCH);
  an embedded controller (EC) including a processing device, read only memory (ROM) and random access memory (RAM), wherein the processing device is configured to execute a boot block stored in ROM to initiate a boot process for the IHS;
  a Flash memory device storing EC application firmware within an EC firmware region of the Flash memory device; and
  a Serial Peripheral Interface (SPI) bus that directly connects the EC to the Flash memory device during a portion of the boot process when the PCH is in reset; and
  wherein the EC is configured to bypass the PCH and directly access the Flash memory device via the SPI bus while the PCH is in reset to retrieve the EC application firmware from the Flash memory device, store a local copy of the EC application firmware in RAM and execute the local copy of the EC application firmware; and
  wherein the local copy of the EC application firmware stored in RAM is executable by the processing device to restore firmware contained within one or more regions of the Flash memory device if the firmware contained therein is determined to be damaged or corrupt.

22. The information handling system as recited in claim 21, wherein the Flash memory device stores boot firmware; and wherein the local copy of the EC application firmware stored in RAM is executable by the processing device to restore the boot firmware stored within the Flash memory device if the boot firmware is determined to be damaged or corrupt.

* * * * *